United States Patent
Hoover et al.

(10) Patent No.: US 10,105,979 B1
(45) Date of Patent: Oct. 23, 2018

(54) OPTIMIZING MICR INK USAGE WITH MULTIPLE INK DROPLET SIZES

(71) Applicant: Xerox Corporation, Norwalk, CT (US)

(72) Inventors: Linn C. Hoover, Webster, NY (US); David A. VanKouwenberg, Avon, NY (US); John P. Meyers, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/687,669

(22) Filed: Aug. 28, 2017

(51) Int. Cl.
*B41J 29/393* (2006.01)
*B41J 2/36* (2006.01)
*B41J 2/205* (2006.01)
*B41J 2/01* (2006.01)

(52) U.S. Cl.
CPC ............... *B41J 29/393* (2013.01); *B41J 2/01* (2013.01); *B41J 2029/3935* (2013.01)

(58) Field of Classification Search
CPC ........... B41J 29/393; B41J 2/2054; B41J 2/36
See application file for complete search history.

(56) References Cited

U.S. PATENT DOCUMENTS

| | | |
|---|---|---|
| 4,924,263 A | 5/1990 | Bares |
| 4,980,726 A | 12/1990 | Aoki |
| 5,210,572 A | 5/1993 | MacDonald et al. |
| 5,337,122 A | 8/1994 | Hubble, III et al. |
| 5,914,209 A | 6/1999 | Grushkin |
| 6,677,092 B2 | 1/2004 | Arai |
| 7,270,918 B2 | 9/2007 | Blood et al. |
| 2005/0142468 A1 | 6/2005 | Blood et al. |
| 2005/0220518 A1 | 10/2005 | Priebe |
| 2010/0238205 A1* | 9/2010 | Thomson ............... B41J 2/175 347/5 |
| 2011/0069101 A1* | 3/2011 | Buschmann ........... B41J 2/2128 347/14 |

* cited by examiner

*Primary Examiner* — Jason Uhlenhake
(74) *Attorney, Agent, or Firm* — Gibb & Riley, LLC

(57) ABSTRACT

An inkjet printhead prints test patches of magnetic ink having magnetic particles using different ink droplet sizes on print media. A sensor scans the test patches to determine test patch densities. A processor determines a table-based density that produces a user-selected magnetic strength by applying the selected magnetic strength to a density and magnetic strength relationship table. The processor identifies a matching test patch as one of the test patches having a density that most closely matches the table-based density, identifies a selected droplet size as the ink droplet size used to print the matching test patch, and controls the printhead to produce magnetic ink droplets of the selected droplet size when printing a print job for the selected magnetic strength.

20 Claims, 9 Drawing Sheets

| MEDIA TYPE | MAGNETIC STRENGTH % | OPTICAL DENSITY |
|---|---|---|
| MEDIA#1 | 30 | 1.00 |
| MEDIA#1 | 50 | 1.20 |
| MEDIA#1 | 130 | 1.40 |
| MEDIA#2 | 20 | 1.00 |
| MEDIA#2 | 50 | 1.20 |
| MEDIA#2 | 80 | 1.40 |
| MEDIA#3 | 60 | 1.00 |
| MEDIA#3 | 80 | 1.20 |
| MEDIA#3 | 110 | 1.40 |

OPTIMIZING MICR INK USAGE WITH MULTIPLE INK DROPLET SIZES

BACKGROUND

Systems and methods herein generally relate to magnetic ink character recognition (MICR) systems, and more particularly to devices and methods that optimize ink usage in MICR printing by controlling ink droplet size to maintain a selected magnetic strength of the printed ink.

Magnetic ink character recognition (MICR) systems are generally used for documents that need to be secured, such as checks, negotiable instruments, etc. MICR systems print using ink that has magnetic particles therein. This allows the printed items to be sensed magnetically, as well as optically, for additional security.

MICR characters printed with an aqueous MICR ink on different types of media produce different levels of magnetic strength due to the ink absorbance into the media. Non-treated media absorbs and disperses the MICR ink in the media fibers, resulting in a lower strength magnetic signal. Ink jet treated media holds the MICR ink on the surface prior to drying, thus concentrating the ink on the surface, and producing a higher magnetic strength.

The American National Standards Institute (ANSI) has a committee that develops all MICR printing standards. The ANSI committee has mandated precise requirements for MICR fonts, toner signal strength, MICR registration, toner adhesion, and for paper grain and moisture content. There are two published standards for MICR: the first covers printing specifications for MICR (ABA 092200) and the second covers printing placement and locations (ABA 092700). These standards that can be ordered from the American Bankers Association (ABA) in Washington, D.C.

ANCS (American National Check Standards) for MICR characters specify different minimum magnetic strengths for different banking markets. In one example, US banks require a minimum 50% magnetic strength value (which is a relative measure) compared to minimum of 80% for Canadian and European markets.

Note that the terms "drop" and "droplet" of ink are used interchangeably herein, and both terms mean the limited quantity of ink that is released by an inkjet, each time the ink jet receives a pulse signal to eject ink. Printers jetting a single size MICR ink drop must jet a sufficient volume of ink to achieve the minimum specified magnetic strengths for non-treated media. Using the same drop size to meet the minimum magnetic strength for the most demanding banking market does not allow the customer to optimize their MICR ink usage, or ink run costs (e.g., for printing checks on treated media, and in less demanding markets).

SUMMARY

Printing apparatuses herein include (among other components) an electronic memory operatively (meaning directly or indirectly) connected to a processor. The electronic memory stores an optical density and magnetic strength relationship table. These structures also include a user interface operatively connected to the processor. The user interface displays a magnetic strength option that is capable of receiving an identification of a selected magnetic strength value (which can be a minimum magnetic strength that printing should stay above).

Also, an inkjet printhead is operatively connected to the processor. The inkjet printhead is capable of printing test patches of magnetic ink (that contains magnetic particles therein) using different ink droplet sizes, on print media. For example, the magnetic ink printed on the print media by the inkjet printhead can be printed on a sacrificial sheet of the print media.

Further, a sensor, such as an optical sensor, an optical densitometer, a magnetic reader, etc., is positioned within the printing apparatuses to optically scan the magnetic ink test patches printed on the print media by the inkjet printhead. The sensor is therefore capable of determining the optical densities of the test patches printed on the print media.

The processor determines a table-based optical density that produces the user-selected magnetic strength by applying the user-selected magnetic strength to the optical density and magnetic strength relationship table stored in the electronic memory. More specifically, different types of the print media have different absorption and dispersal characteristics, and the test patches result in different densities of the magnetic ink, depending on the different absorption and dispersal characteristics of the print media loaded in the printer. Thus, the processor identifies a matching test patch as the test patch that has an optical density that most closely matches the table-based optical density.

This allows the processor to identify a selected droplet size as the ink droplet size used to print the matching test patch, and controls the printhead to produce magnetic ink droplets of the selected droplet size when printing a print job requiring the selected magnetic strength. Therefore, even though the processor receives a print job calling for printing the magnetic ink on the print media using a fixed drop size, the processor changes this fixed drop size when controlling the droplet size to maintain the selected magnetic strength.

Various methods herein create an optical density and magnetic strength relationship table that outputs magnetic strengths from inputs of densities of printed magnetic ink. For example, the optical density and magnetic strength relationship table can be based on empirical testing, modeling, etc. The optical density and magnetic strength relationship table adjusts values of magnetic strength per optical density. These methods store the optical density and magnetic strength relationship table in an electronic memory of a printing apparatus. Further, such methods display (on a user interface of the printing apparatus) a magnetic strength option that is capable of receiving an identification of a selected magnetic strength value.

At some point, the processor receives a print job calling for printing the magnetic ink on the print media, possibly using a fixed drop size. In response, these methods automatically print test patches of magnetic ink (that contains magnetic particles) using different ink droplet sizes on print media, using an inkjet printhead of the printing apparatus. For example, the magnetic ink printed on the print media by the inkjet printhead can be printed on one or more sacrificial sheets of the print media. Also, such methods automatically scan (e.g., using a sensor of the printing apparatus) the test patches to determine the test patch optical densities.

With this, the methods herein can automatically determine a table-based optical density that produces a user-selected magnetic strength by applying the user-selected magnetic strength to an optical density and magnetic strength relationship table. Therefore, when identifying the matching test patch, these methods use only the optical measurements from the sensor, and a reference to the optical density and magnetic strength relationship table.

With such processing, the methods herein can automatically identify a matching test patch as the test patch that has an optical density that most closely matches the table-based optical density, identify a selected droplet size as the ink droplet size used to print the matching test patch, and control the printhead to produce magnetic ink droplets of the selected droplet size when printing a print job for the selected magnetic strength. This process of controlling the droplet size to maintain said selected magnetic strength.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
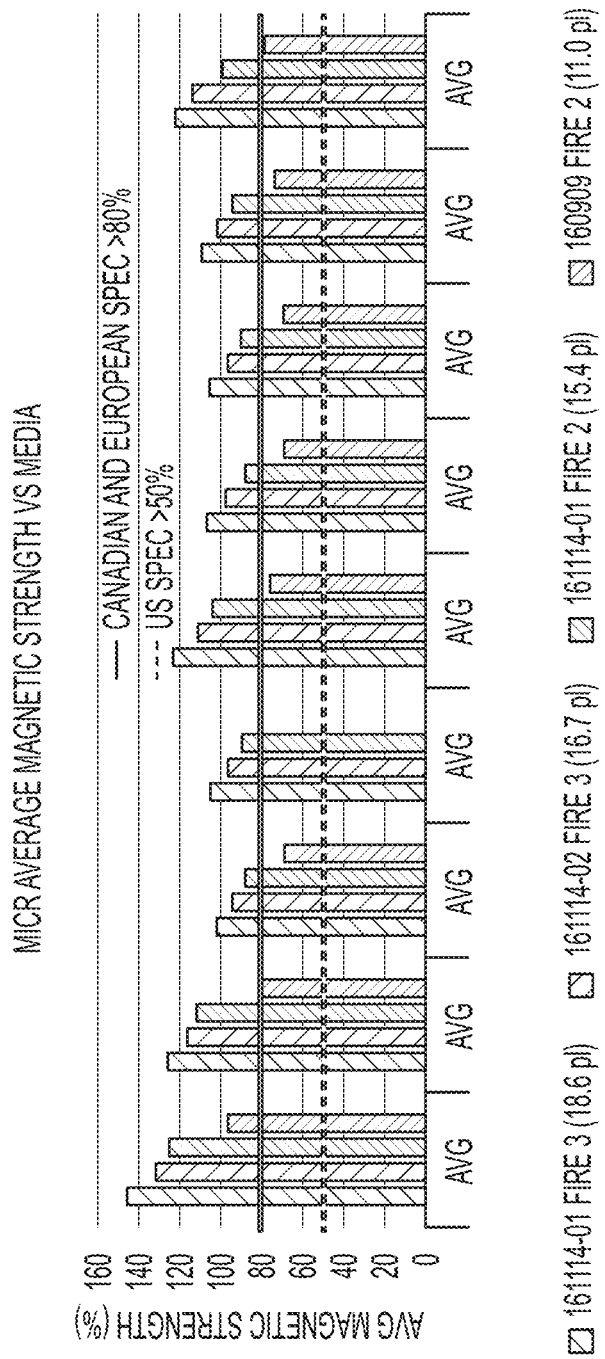
FIG. 1 is a chart showing MICR magnetic strengths developed and used by devices and methods herein.

As mentioned above, using the same drop size to meet the minimum magnetic strength for the most demanding banking market does not allow the customer to optimize their MICR ink usage. Therefore, the systems and methods herein enable the operator of an ink jet printer to optimize MICR ink usage, and MICR character magnetic strength, when printed on different types of media. A correlation between MICR ink optical density and magnetic strength is developed by devices and methods here, and the same is used to estimate the magnetic strength of MICR characters printed on a specific media.

Additionally, with these devices and methods, the MICR ink optical density and magnetic strength can be varied to keep the magnetic strength of the MICR printed characters close to (e.g., at, or slightly above) the minimum required magnetic strength, by changing the size of the ink drop jetted on the media, based on the magnetic strength estimated from the measured printing density. This optimizes the use of the relatively expensive MICR ink, by only using the minimum amount of ink needed to achieve the minimum magnetic strength, and not using ink in excess of such amounts.

This is contrasted with fixed droplet size MICR printing, which establishes a single droplet size to ensure that the minimum magnetic strength is printed under all conditions. Fixed droplet size MICR printing selects a droplet size that produces the minimum magnetic strength for a worst-case print media (e.g., print media with the relatively highest absorption and dispersal values, such as non-treated media), and uses that worst-case droplet size for all media types. Such fixed droplet size MICR printing can use excessive amounts of ink when printing on more optimal media (e.g., print media with the relatively lower absorption and dispersal values, such as treated media), even though more optimal media does not need as much ink to achieve the same minimum magnetic strength. In other words, because fixed droplet size MICR printing uses an amount of ink that can attain a certain magnetic strength on worst-case print media for all media types, it uses excessive ink when printing on all types of print media other than the worst-case media. In contrast, the devices and methods herein adjust the MICR ink droplet size depending upon the ink absorption and ink dispersal characteristics of the print media being printed on, using test patches of different droplet sizes printed on that media, in order to use just enough ink to achieve the minimum magnetic strength, without using excessive ink.

While printers are not commonly equipped with MICR magnetic sensing equipment, printers are often equipped with optical sensors, which optically sense toner/ink on printed sheets to check for printing quality. A printer so equipped with a sensor can measure the densities of patches printed with different size MICR ink drops. Using stored data (e.g., database or table) containing a list of media with corresponding optical densities and correlated magnetic strengths, the printer can automatically select the drop size required to meet the minimum magnetic strength for the customer job, as input by the operator.

As an example of the processing performed by devices and methods herein to create an optical density and magnetic strength relationship table, FIG. 1 shows the average magnetic strengths for MICR characters printed with one 600× 600 DPI channel on nine different media (e.g., Media#1-#9). Some media (Media#3-#4) were not treated for aqueous ink jet, while other media (Media#1-#2 and Media#5-#9) were treated. The ANCS minimum magnetic strengths for the US versus Canada are highlighted on the FIG. 1. The bars represent 4 different waveforms for each media that produce drop sizes ranging from 11 to 18.6 Pico liter (pl) drops.

The variation in magnetic strength versus drop size is consistent across all 9 media types with the non-treated media producing the lowest magnetic strengths. In one specific example, a printer jetting only one drop size would have to jet an 18-20 pl drop to meet the >80% Canadian specification for the Media#3; however, using this drop size for all media types wastes ink because that amount of ink is not needed by the other media types to achieve the same magnetic strength. For example, customer printing checks for the US market would jet 30%-250% more ink than required to meet the >50% magnetic strength spec with a treated media, if fixed droplet size printing were used.

Aqueous print heads are capable of jetting multiple size ink drops by changing the waveform that drives the ink drop jetting mechanism. The drop sizes used to print non-MICR image are determined by printer's Digital Front End (DFE) when it renders the image file. In contrast, MICR image files typically do not possess image rendering information, and are therefore assigned a fixed drop size. The features of methods and devices herein that enable the customer to select the desired MICR magnetic strength, based on media type and end user requirements, optimize MICR ink cost per page.

As noted above, the devices and methods herein create a correlation between optical density and magnetic strength for a given media. A database, table, etc., containing the correlated optical densities versus magnetic strengths for the different types of media is therefore created. Further, the devices and methods herein provide a MICR application in the printer's user interface that allows the operator to input the desired minimum magnetic strength required for the print job. This database contains optical densities and corresponding magnetic strengths for multiple types of media.

Figure 2:
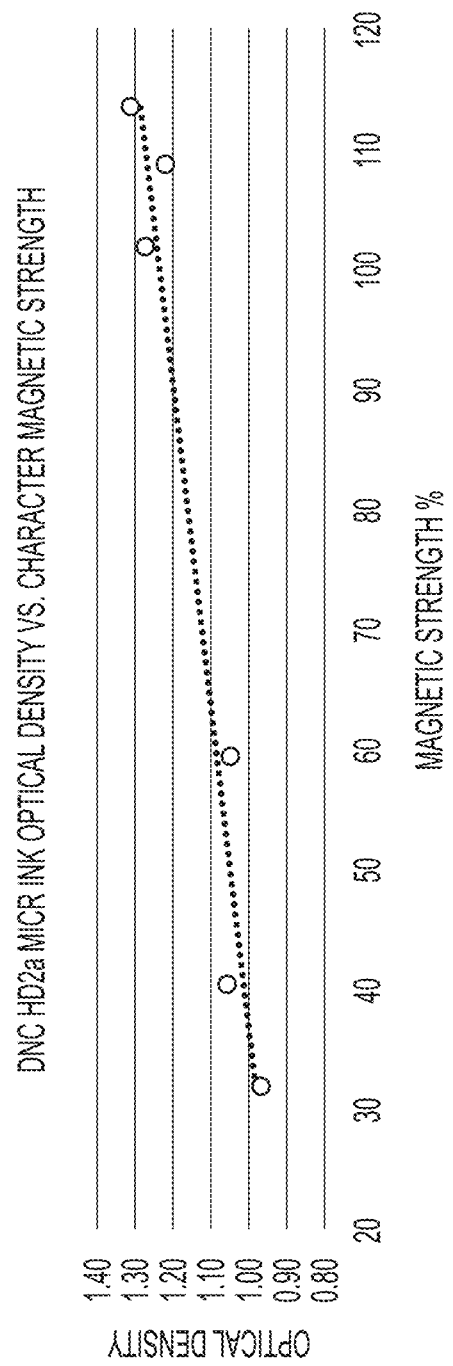
FIG. 2 is an optical density and magnetic strength relationship table/graph produced and used by devices and methods herein.

The printer prints test sample patches with multiple drop sizes on the desired media. A sensor inside the printer reads the optical patch for each drop size, these densities are correlated with magnetic strengths using the database or table, and the printer automatically programs the print heads with the appropriate waveform of the drop size that produces the desired magnetic strength. FIG. 2 shows the variation in optical density of a 10×10 mm patch of MICR ink versus the magnetic strength for a line of MICR characters produced by such processing.

Thus, the methods and devices herein provide a user interface that allows an operator to input the minimum MICR magnetic strength percentage required by the customer. To determine what magnetic strength a specific printer will print on a specific type of media, the methods and devices herein print test patches using different drop sizes on a sacrificial test sheet, optically scan the test patches using a sensor to find the optical densities that the different drop sizes produce, and then find the correlated magnetic strength that such drop sizes produce on such media using the optical density and magnetic strength relationship table. Once a drop size is found that will produce the minimum MICR magnetic strength required by the customer from the test patches, the methods and devices herein automatically program the print heads with a waveform that will deliver that drop size. Otherwise, the methods and systems herein automatically default to the maximum MICR drop size, if no magnetic strength is specified.

Figure 3:
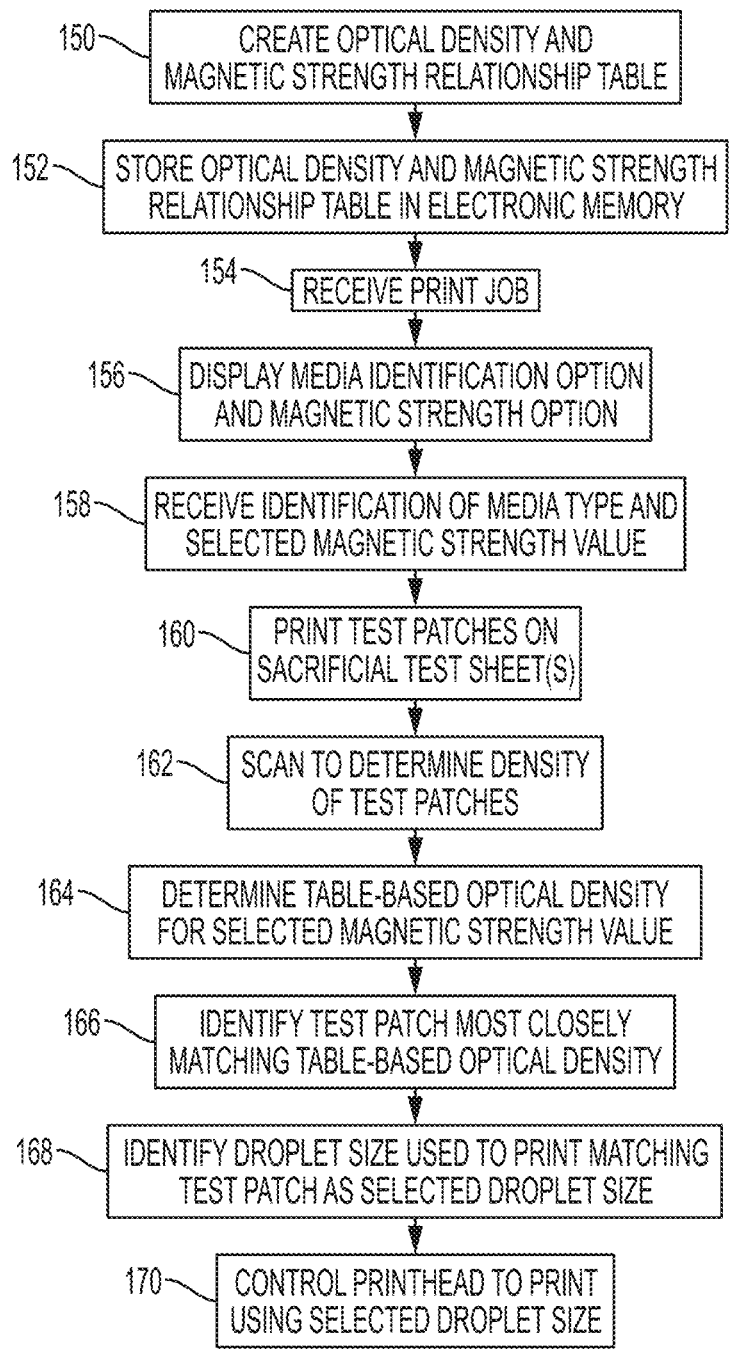
FIG. 3 is a flow diagram of various methods herein.
Figures 4, 5:
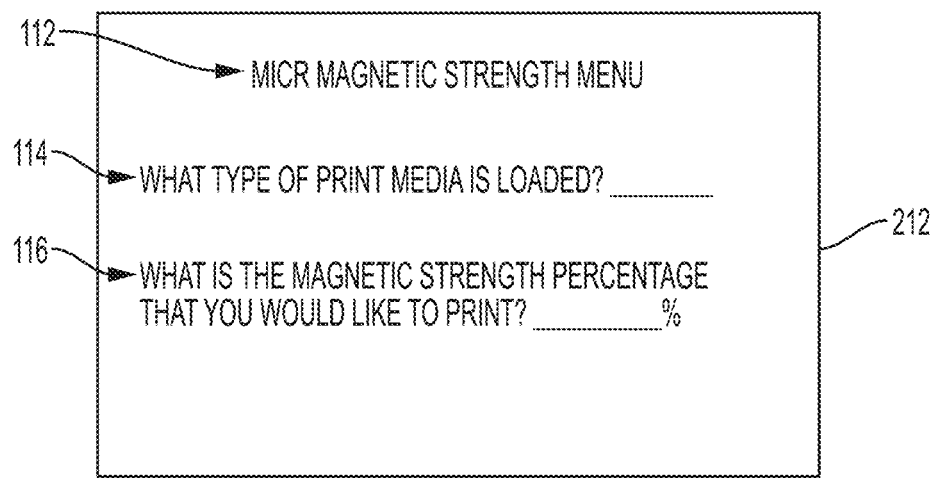
FIG. 4 is a table produced by devices and methods herein.
FIG. 5 is a menu provided on a user interface by devices and methods herein.

FIG. 3 is flowchart illustrating exemplary methods herein. In item 150, these methods create an optical density and magnetic strength value relationship database or table that outputs magnetic strength values from inputs of densities of printed magnetic ink, and an identification of the media type used for printing. An example of an optical density and magnetic strength value relationship table created by the methods and devices herein for media types Media#1-Media#3 is shown in FIG. 4. As can be seen in FIG. 4, as the optical density increases, the magnetic strength value also increases; however, such increases are different for the different types of media.

For example, the optical density and magnetic strength value relationship table shown in FIG. 4 can be based on empirical testing, modeling, etc., that compares and correlates measurements of optical density and magnetic strength value. For example, the empirical actual test data from FIG. 2 can be used to make the table shown in FIG. 4. The optical density and magnetic strength value relationship table adjusts the values of magnetic strength value per optical density. Referring back to FIG. 3, in item 152, these methods store such an optical density and magnetic strength value relationship table in an electronic memory of a printing apparatus.

In item 154, the processor receives a MICR print job calling for printing the magnetic ink on the print media (potentially using a fixed drop size). In response, in item 156, such methods display (on a user interface of the printing apparatus) a media-type identification option that is capable of receiving an identification of the media type being used for printing, and a magnetic strength value option that is capable of receiving an identification of a selected magnetic strength value (which can be a minimum magnetic strength value that printing should stay above). For example, as shown in FIG. 5, a user interface 212 of the printing apparatus can display a MICR magnetic strength value menu 112 that includes a media-type identification option 114 that asks the user what type of print media is loaded, with an input field (which can be a blank to be filled in by the user, a drop-down menu of media type choices, etc.) that is capable of receiving the identification of the media type being used for printing. As also shown in FIG. 5, the MICR magnetic strength value menu 112 also includes a magnetic strength value option 116 that asks the user what magnetic strength value percentage is wanted, with an input field (which again can be a blank to be filled in by the user, a drop-down menu of media type choices, etc.) that is capable of receiving the identification of a selected magnetic strength value. Referring back to FIG. 3, in item 158, the identification of the media type being used for printing, and the selected magnetic strength value are received from user input into the user interface.

Items 114 and 116 in FIG. 5 can be blanks that the user fills in, or can be drop down menu choices. One advantage of a drop down table is that it shows which media have corresponding optical density and magnetic strength values. If the user selects a "Other Media" option in the drop down menu, they are prompted to input the desired drop size or default to the largest drop. The user interface also enables the user to run a series of optical test patches and test MICR images for each available drop size for an unknown media. The user measures the magnetic strength using an ANSI approved magnetic reader for each drop size and creates a new optical density and magnetic strength chart in the printer memory.

Figure 6A:
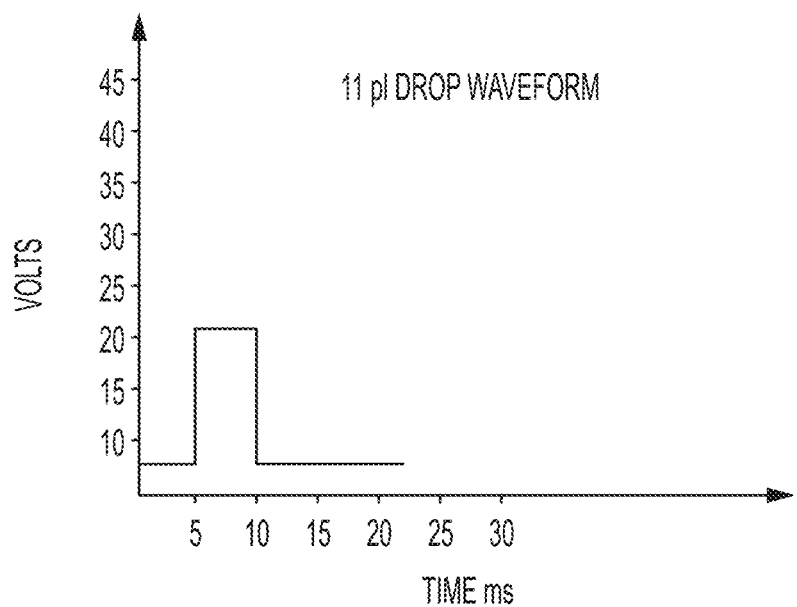
FIGS. 6A-6B are charts showing waveforms produced by devices and methods herein.
Figure 6B:
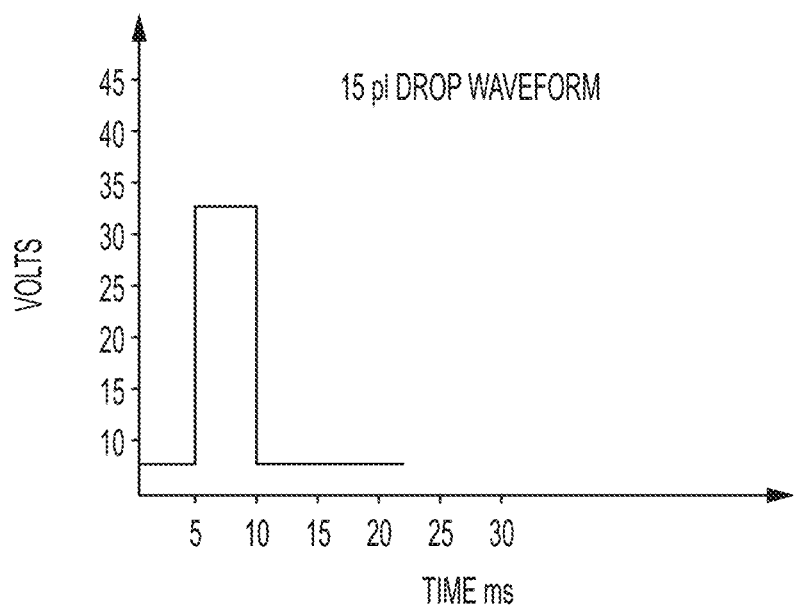

Then, in item 160, these methods automatically print test patches of magnetic ink having magnetic particles using different ink droplet sizes on print media, using an inkjet printhead of the printing apparatus. For example, as shown in FIGS. 6A-6B, different voltage waveforms (shown over time) can be used to cause inkjets to eject differently sized droplets of ink, which the relatively higher voltage supplied to the inkjets in FIG. 6B produces a larger droplet. Adjusting the voltage changes the amount of ink jetted; however, the amount of ink jetted is related to more than turning the voltage up and down. The waveform profile is critical to producing a perfect ink drop without satellites (ink sputter) that cause ragged images, poor image quality, and lower magnetic strength. The waveform profiles are controlled by the print head manufacturer and not easily adjusted, so some examples herein are limited to a finite number of ink drop sizes.

Figure 7:
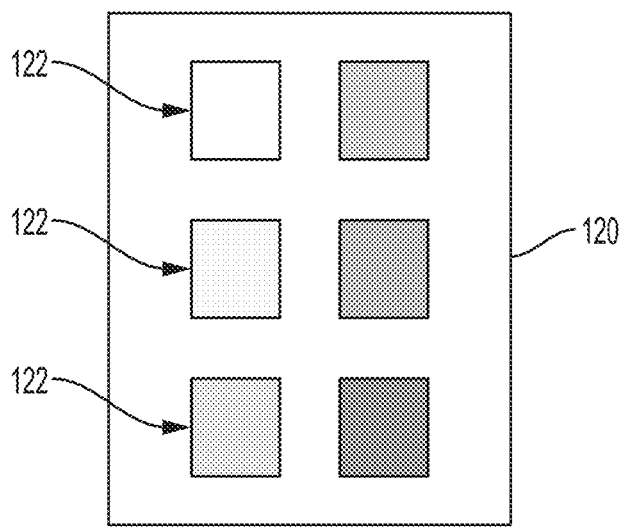
FIG. 7 is a schematic diagram of test patches printed by devices and methods herein.

As shown in FIG. 7, the test patches 122 of magnetic ink printed on the print media by the inkjet printhead can be printed on one or more sacrificial sheets of the print media 120. For example, sheet 120 can be media type Media#2, and each of the different test patches 122 can be printed using different droplet sizes ejected from the ink jets. The droplet sizes are the only thing that changes from test patch to test patch, and all other printing parameters (DPI, color, ink type, etc.) are held the same.

Figure 8:
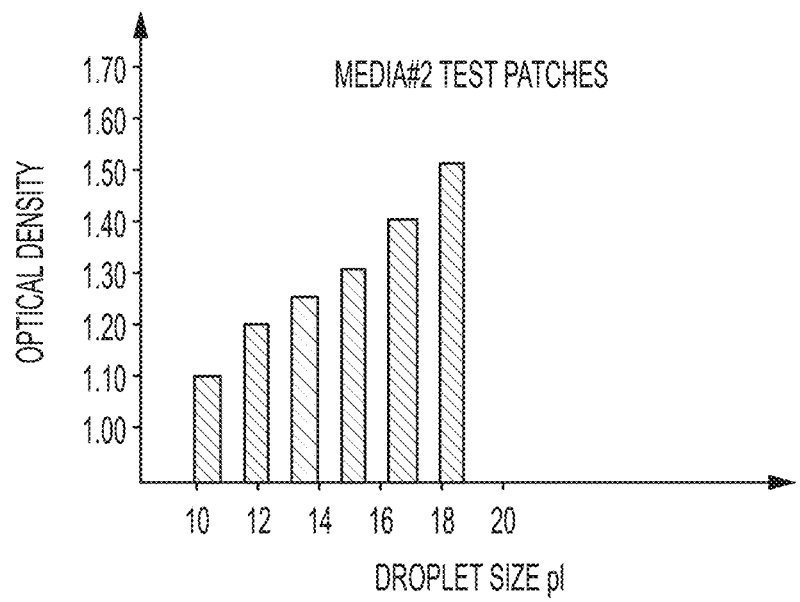
FIG. 8 is a bar chart created by devices and methods herein.

Referring again to FIG. 3, after the sacrificial sheets of test patches are printed in item 160, next in item 162 such methods automatically scan (e.g., using a sensor, such as an optical sensor, an optical densitometer, a magnetic reader, etc., of the printing apparatus) the magnetic ink test patches printed on the print media to determine the densities of the test patches (e.g., to find the test patch optical densities). FIG. 8 is a bar chart showing exemplary optical densities that a densitometer could find when scanning different test patches that were printed using different droplet sizes ejected from the ink jets. Continuing with the example used in FIG. 7, in FIG. 8, the six optical densities are of the six test patches 122 on sheet 120 of Media#2, shown in FIG. 7.

Referring back to FIG. 3, in item 164 the methods herein automatically determine (again, using the processor of the printing apparatus) a table-based optical density that produces the user-selected magnetic strength value by applying the user-selected magnetic strength value to the optical density and magnetic strength value relationship table. Therefore, when identifying the matching test patch, these methods use only the optical measurements from the optical sensor, and a reference to the optical density and magnetic strength value relationship table for the specified media.

In item 166, the methods herein automatically identify a matching test patch as one of the test patches that has an optical density that most closely matches the table-based optical density. If the user-selected magnetic strength value is a minimum magnetic strength value that all printing should stay above, the matching test patch is the test patch that most closely matches the table-based optical density, without being below the table-based optical density. In other words, when the user-selected magnetic strength value is a minimum magnetic strength value, the matching test patch that most closely matches the table-based optical density within the group of test patches that have an optical density that is at least equal to or greater than table-based optical density.

Processing in item 168 identifies the ink droplet size that was used to print the matching test patch as the "selected" droplet size to be used for printing. Thus, whatever ink droplet size that was used to print the test patch that eventually is identified as the matching test patch, is the ink droplet size that will be used to print the print job. In item 170, these methods control the waveform sent to the printhead to eject magnetic ink droplets of the selected droplet size when printing the print job received in item 154, for the selected magnetic strength value and media type selected by the user in item 158.

In the example shown above, if the user selected 50% magnetic strength MICR printing on Media#2 (in items 114-116 in FIG. 5), the processor automatically refers to the fifth row (for Media#2, 50%) in the optical density and magnetic strength relationship table in FIG. 4, which outputs a selected optical density of 1.20. The processor then uses the optical density results from scanning the test patches with a densitometer, shown in FIG. 8, which indicates that a 12 pl droplet size will result in printing that produces an optical density of 1.20 on Media#2, which will in turn result in the selected magnetic strength of 50% on Media#2 on the printed print job.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by human alone (or one operating with a pen and a pad of paper) and instead such processes can only be performed by a machine. Specifically, processes such as, optically scanning printed sheets to determine printing density, controlling waveforms, controlling printheads using electronic data within bitmaps to perform printing, etc., requires the utilization of different specialized machines. Therefore, for example, the ink droplet size control performed by the user device cannot be performed manually (because such items are too small and sensitive to be performed by humans without machines) and is integral with the processes performed by methods herein.

Further, such machine-only processes are not mere "post-solution activity" because the methods utilize machines at each step, and cannot be performed without machines. Also, the determination of printing density, ink droplet size control, etc., is integral with the process performed by the methods herein, and is not mere post-solution activity, because the methods herein rely upon the previous machine-produced items to affect later machine control. In other words, these various machines are integral with the methods herein because the methods cannot be performed without the machines (and cannot be performed by humans alone).

Additionally, the methods herein solve many highly complex technological problems. For example, as mentioned above, because fixed droplet size MICR printing uses an amount of ink that can attain a certain magnetic strength on worst-case print media for all media types, it uses excessive ink when printing on all types of print media other than the worst-case media. In contrast, the devices and methods herein adjust the MICR ink droplet size depending upon the ink absorption and ink dispersal characteristics of the print media being printed on, using test patches of different droplet sizes printed on that media, in order to use just enough ink to achieve the minimum magnetic strength, without using excessive ink.

Figure 9:
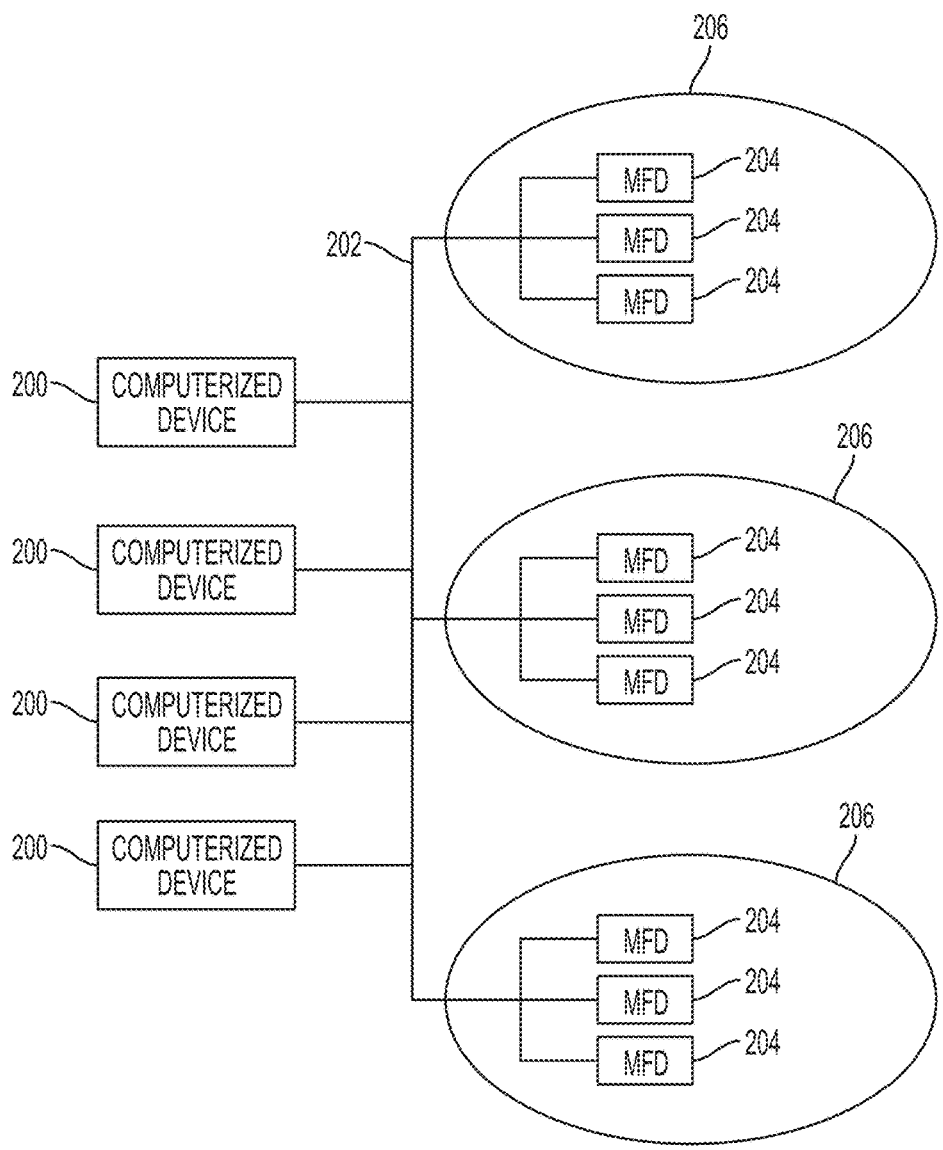
FIG. 9 is a schematic diagram illustrating systems herein.

As shown in FIG. 9, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 10:
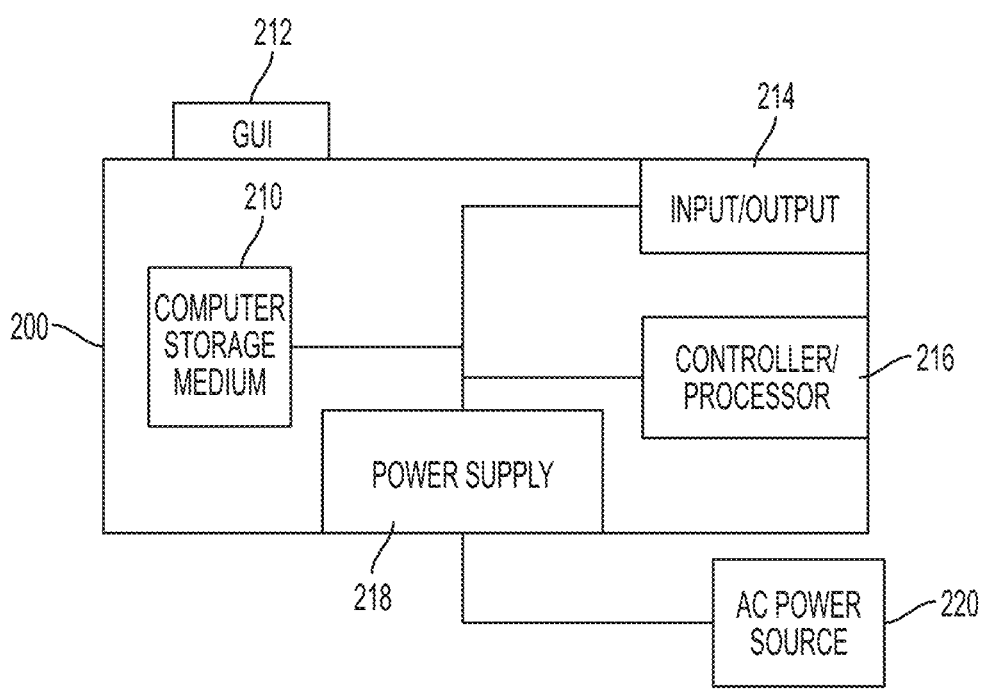
FIG. 10 is a schematic diagram illustrating devices herein.

FIG. 10 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 10, a body housing has one or more functional components that operate on power supplied from an alternating current (AC) source 220 by the power supply 218. The power supply 218 can comprise a common power conversion unit, power storage element (e.g., a battery, etc), etc.

Figure 11:
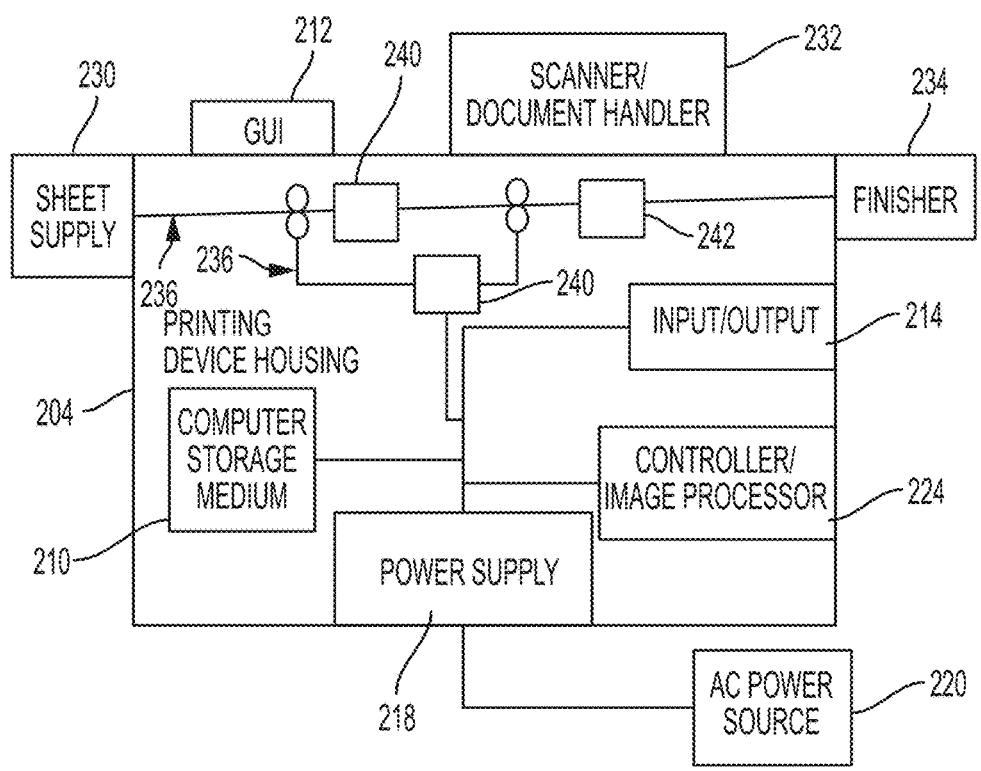
FIG. 11 is a schematic diagram illustrating devices herein.

FIG. 11 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Therefore, printing apparatuses herein (which can be a single machine 204, or systems of machines (FIG. 9) include (among other components) a local or remote electronic memory 210 operatively (meaning directly or indirectly) connected to a processor 216/224. The electronic memory 210 stores an optical density and magnetic strength relationship table. These structures also include a user interface 212 operatively connected to the processor 216/224. The user interface 212 displays a magnetic strength option that is capable of receiving an identification of a selected magnetic strength value (which can be a minimum magnetic strength that printing should stay above).

Also, an inkjet printhead 240 is operatively connected to the processor 216/224. The inkjet printhead 240 is capable of printing test patches of magnetic ink (that contains magnetic particles therein) using different ink droplet sizes, on print media. For example, the magnetic ink printed on the print media by the inkjet printhead 240 can be printed on a sacrificial sheet of the print media.

Further, a sensor 242, such as an optical sensor, an optical densitometer, a magnetic reader, etc., is positioned within the printing apparatuses to optically scan the magnetic ink test patches printed on the print media by the inkjet printhead 240. The sensor 242 is therefore capable of determining the densities of the test patches printed on the print media.

The processor 216/224 determines a table-based optical density that produces the user-selected magnetic strength by applying the user-selected magnetic strength to the optical density and magnetic strength relationship table stored in the electronic memory 210. More specifically, different types of the print media have different absorption and dispersal characteristics, and the test patches result in different densities of the magnetic ink, depending on the different absorption and dispersal characteristics of the print media loaded in the printer. Thus, the processor 216/224 identifies a matching test patch as the test patch that has an optical density that most closely matches the table-based optical density.

This allows the processor 216/224 to identify a selected droplet size as the ink droplet size used to print the matching test patch, and controls the printhead 240 to produce magnetic ink droplets of the selected droplet size when printing a print job requiring the selected magnetic strength. Therefore, even though the processor 216/224 receives a print job calling for printing the magnetic ink on the print media using a fixed drop size, the processor 216/224 changes this fixed drop size when controlling the droplet size to keep the magnetic strength of the magnetic ink printed on the print media at the user-selected magnetic strength value.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing apparatus comprising:
   a processor;
   an electronic memory operatively connected to said processor, said electronic memory maintains a density and magnetic strength relationship table;
   an inkjet printhead operatively connected to said processor, said inkjet printhead prints test patches of magnetic ink having magnetic particles using different ink droplet sizes on print media; and a sensor positioned to optically scan said magnetic ink printed on said print media by said inkjet printhead, said sensor scans said test patches printed on said print media to determine densities of said test patches, said processor determines a table-based density that produces a selected magnetic strength by applying said selected magnetic strength to said density and magnetic strength relationship table stored in said electronic memory, said processor identifies a matching test patch as one of said test patches having a density that most closely matches said table-based density, said processor identifies a selected droplet size as one of said different ink droplet sizes used to print said matching test patch, and said processor controls said inkjet printhead to produce magnetic ink droplets of said selected droplet size when printing a print job for said selected magnetic strength.

2. The printing apparatus according to claim 1, different types of said print media have different absorption and dispersal characteristics, and said test patches produce different densities of said magnetic ink based on said different absorption and dispersal characteristics.

3. The printing apparatus according to claim 1, said processor identifies said matching test patch using only measurements from said sensor, and reference to said density and magnetic strength relationship table.

4. The printing apparatus according to claim 1, said processor receives a print job calling for printing said magnetic ink on said print media using a fixed drop size, and said processor changes said fixed drop size when controlling said droplet sizes to maintain said selected magnetic strength.

5. The printing apparatus according to claim 1, said magnetic ink printed on said print media by said inkjet printhead comprises test patches printed on a sacrificial sheet of said print media.

6. A printing apparatus comprising:
a processor;
an electronic memory operatively connected to said processor, said electronic memory is capable of storing an optical density and magnetic strength relationship table;
a user interface operatively connected to said processor, said user interface is capable of displaying a magnetic strength option that is capable of receiving an identification of a selected magnetic strength;
an inkjet printhead operatively connected to said processor, said inkjet printhead is capable of printing test patches of magnetic ink having magnetic particles using different ink droplet sizes on print media; and
an optical densitometer positioned to optically scan said magnetic ink printed on said print media by said inkjet printhead,
said optical densitometer is capable of optically scanning said test patches printed on said print media to determine optical densities of said test patches,
said processor is capable of determining a table-based optical density that produces said selected magnetic strength by applying said selected magnetic strength to said optical density and magnetic strength relationship table stored in said electronic memory, and said processor is capable of identifying a matching test patch as one of said test patches having an optical density that most closely matches said table-based optical density, said processor is capable of identifying a selected droplet size as one of said different ink droplet sizes used to print said matching test patch, and said processor is capable of controlling said inkjet printhead to produce magnetic ink droplets of said selected droplet size when printing a print job for said selected magnetic strength.

7. The printing apparatus according to claim 6, different types of said print media have different absorption and dispersal characteristics, and said test patches produce different densities of said magnetic ink based on said different absorption and dispersal characteristics.

8. The printing apparatus according to claim 6, said processor is capable of identifying said matching test patch using only optical measurements from said optical densitometer, and reference to said optical density and magnetic strength relationship table.

9. The printing apparatus according to claim 6, said processor is capable of receiving a print job calling for printing said magnetic ink on said print media using a fixed drop size, and said processor changes said fixed drop size when controlling said droplet sizes to maintain said selected magnetic strength.

10. The printing apparatus according to claim 6, said magnetic ink printed on said print media by said inkjet printhead comprises test patches printed on a sacrificial sheet of said print media.

11. A method comprising:
creating a density and magnetic strength relationship table that outputs magnetic strengths from inputs of densities of printed magnetic ink, and identification of media types used for printing;
printing test patches of magnetic ink having magnetic particles using different ink droplet sizes on print media, using an inkjet printhead of a printing apparatus;
optically scanning said test patches printed on said print media to determine densities of said test patches, using a sensor of said printing apparatus;
determining, by a processor of said printing apparatus, a table-based density that produces a selected magnetic strength by applying said selected magnetic strength to said density and magnetic strength relationship table;
identifying, by said processor, a matching test patch as one of said test patches having a density that most closely matches said table-based density;
identifying, by said processor, a selected droplet size as one of said different ink droplet sizes used to print said matching test patch; and
controlling said inkjet printhead to produce magnetic ink droplets of said selected droplet size when printing a print job for said selected magnetic strength.

12. The method according to claim 11, different types of said print media have different absorption and dispersal characteristics, and said test patches produce different densities of said magnetic ink based on said different absorption and dispersal characteristics.

13. The method according to claim 11, said identifying said matching test patch uses only measurements from said sensor, and reference to said density and magnetic strength relationship table.

14. The method according to claim 11, further comprising receiving, into said processor, a print job calling for printing said magnetic ink on said print media using a fixed drop size, said controlling said droplet sizes to maintain said selected magnetic strength.

15. The method according to claim 11, said printing magnetic ink comprises printing test patches printed on a sacrificial sheet of said print media.

16. A method comprising:
creating an optical density and magnetic strength relationship table that outputs magnetic strengths from inputs of densities of printed magnetic ink, and identification of media types used for printing, based on empirical testing;
storing said optical density and magnetic strength relationship table in an electronic memory of a printing apparatus;
displaying, on a user interface of said printing apparatus a magnetic strength option that is capable of receiving an identification of a selected magnetic strength;
automatically printing test patches of magnetic ink having magnetic particles using different ink droplet sizes on print media, using an inkjet printhead of said printing apparatus;
automatically optically scanning said test patches printed on said print media to determine optical densities of said test patches, using an optical densitometer of said printing apparatus;
automatically determining, by a processor of said printing apparatus, a table-based optical density that produces a selected magnetic strength by applying said selected magnetic strength to said optical density and magnetic strength relationship table stored in said electronic memory;
automatically identifying, by said processor, a matching test patch as one of said test patches having an optical density that most closely matches said table-based optical density;
automatically identifying, by said processor, a selected droplet size as one of said different ink droplet sizes used to print said matching test patch; and
automatically controlling said inkjet printhead to produce magnetic ink droplets of said selected droplet size when printing a print job for said selected magnetic strength.

17. The method according to claim 16, different types of said print media have different absorption and dispersal characteristics, and said test patches produce different densities of said magnetic ink based on said different absorption and dispersal characteristics.

18. The method according to claim 16, said identifying said matching test patch uses only optical measurements from said optical densitometer, and reference to said optical density and magnetic strength relationship table.

19. The method according to claim 16, further comprising receiving, into said processor, a print job calling for printing said magnetic ink on said print media using a fixed drop size, said controlling said droplet sizes to maintain said selected magnetic strength.

20. The method according to claim 16, said printing magnetic ink comprises printing test patches printed on a sacrificial sheet of said print media.

\* \* \* \* \*